United States Patent
Shiozaki et al.

(10) Patent No.: US 6,783,323 B2
(45) Date of Patent: Aug. 31, 2004

(54) GAS TURBINE STATIONARY BLADE

(75) Inventors: Shigehiro Shiozaki, Hyogo (JP);
Masamitsu Kuwabara, Hyogo (JP);
Yasuoki Tomita, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 77 days.

(21) Appl. No.: 10/189,413

(22) Filed: Jul. 8, 2002

(65) Prior Publication Data
US 2003/0012647 A1 Jan. 16, 2003

(30) Foreign Application Priority Data
Jul. 11, 2001 (JP) .................................... 2001-211300

(51) Int. Cl.[7] .............................................. F01D 9/06
(52) U.S. Cl. ..................................... 415/115; 415/175
(58) Field of Search ................................ 415/115, 116, 415/175, 177, 178; 416/96 R, 97 R

(56) References Cited

U.S. PATENT DOCUMENTS

| 4,127,358 A | * | 11/1978 | Parkes | 416/97 R |
| 4,353,679 A | * | 10/1982 | Hauser | 415/115 |
| 5,813,835 A | * | 9/1998 | Corsmeier et al. | 415/115 |
| 6,036,436 A | * | 3/2000 | Fukuno et al. | 415/115 |
| 6,079,946 A | * | 6/2000 | Suenaga et al. | 416/97 R |
| 6,089,822 A | | 7/2000 | Fukuno | |
| 6,264,426 B1 | * | 7/2001 | Fukuno et al. | 415/115 |

FOREIGN PATENT DOCUMENTS

| EP | 911488 A1 | * | 4/1999 | ............ F01D/9/02 |
| JP | 7-305638 | | 11/1995 | |
| JP | 10-196308 | | 7/1998 | |
| JP | 10196308 A | * | 7/1998 | ............ F01D/9/04 |
| JP | 11-125102 | | 5/1999 | |
| JP | 11-132005 | | 5/1999 | |

* cited by examiner

Primary Examiner—Edward K. Look
Assistant Examiner—Richard A. Edgar
(74) Attorney, Agent, or Firm—Oblon, Spivak, McClelland, Maier & Neustadt, P.C.

(57) ABSTRACT

The gas turbine stationary blade comprises a stationary blade section provided therein with a passage for cooling air, an inner shroud for supporting the stationary blade section on the side of a discharge port of the cooling air, and a plurality of segments each of which includes at least one stationary blade section and at least one inner shroud. A flow passage is pulled out from the discharge port of the cooling air, and the flow passage is introduced to a front edge corner section of the inner shroud and is extended rearward along a side edge of the inner shroud.

7 Claims, 10 Drawing Sheets

US 6,783,323 B2

GAS TURBINE STATIONARY BLADE

FIELD OF THE INVENTION

The present invention relates to a cooling structure of a gas turbine stationary blade mainly used for a two or more-staged stationary blade.

BACKGROUND OF THE INVENTION

A stationary blade of a gas turbine used for generating electric power provides a flow passage for combustion gas, of which temperature reaches about 1300° C. Therefore, in order to prevent melt or damage of the stationary blade by combustion gas, various cooling structures are provided to the gas turbine stationary blade. As a technique concerning such a cooling structure, there is a widely-known technique in which a passage for cooling air is provided in the gas turbine stationary blade, cooling air is sent into this passage, thereby cooling the gas turbine stationary blade from inside (refer to Japanese Patent Application Laid-open No. 11-132005 for example).

The gas turbine stationary blade has a dividable structure capable of assembling and disassembling the gas turbine stationary blade in consideration of easy maintenance after installation thereof. FIG. 14 is a perspective view showing a segment 1 that is a unit constituent element of a two-staged stationary blade of a gas turbine. Each unit constituting this segment 1 comprises a substantially parallelogram inner shroud 2, one columnar stationary blade section 3 whose one end is fixed to the inner shroud 2, and a substantially parallelogram outer shroud 4 installed substantially in parallel to the inner shroud 2 and fixed to the other end of the stationary blade section 3. The segment 1 comprises a pair of the units welded and connected to each other side-by-side. The gas turbine stationary blade comprises a plurality of segments 1 connected to one other side-by-side through detachable connection members (not illustrated) such as bolts such that the gas turbine stationary blade is formed into an annular structure as a whole. The gas turbine stationary blade is fixed and installed in a gas turbine casing (not illustrated) with a cantilever structure by means of legs 5 provided on an outer peripheral side face of the outer shroud 4.

A bolt joint section 7 of the segment 1 keeps a specific distance so as to absorb expansion of the gas turbine stationary blade when the gas turbine is driven. This distance is set such that the distance is made zero by expansion of the gas turbine stationary blade when the gas turbine is driven. However, due to tolerance during the actual producing procedure, a gap 7a ranging from about 0.5 mm to 1 mm is produced in the bolt joint section 7.

FIG. 15 is an enlarged perspective view around the inner shroud 2 shown in FIG. 14. FIG. 16 is a plan sectional view of the inner shroud 2 shown in FIG. 15. FIG. 17 is a side sectional view of the inner shroud 2 taken along the line I—I in FIG. 16. FIG. 18 is a side sectional view of the inner shroud 2 taken along the line II—II in FIG. 16. In FIG. 15 to FIG. 18, the gas turbine stationary blade has a stationary blade section front edge passage 9 and a stationary blade section rear edge passage 10 isolated from each other by a rib 8 which are provided inside the stationary blade section 3. The stationary blade section front edge passage 9 is in communication with an open chamber 11 provided in the inner shroud 2. The stationary blade section rear edge passage 10 passes through the inner shroud 2, and is in communication with a cavity 12 formed in a bottom face section of the inner shroud 2. The open chamber 11 and the cavity 12 are isolated from each other by a bottom plate 13 installed on the bottom face section of the inner shroud 2. A member 14, shown in FIG. 17, in the stationary blade section 3 is an impingement tube 14 comprising a metal member inserted into the stationary blade section front edge passage 9 and the stationary blade section rear edge passage 10 so as to subject the stationary blade section 3 to impingement cooling.

In the inner shroud 2, a front edge 15 is located in upstream portion in the flow passage for combustion gas 6. A front edge flow passage 16 is provided along the front edge 15. The front edge flow passage 16 and the open chamber 11 are in communication with each other through an intermediate flow passage 17 provided therebetween. A regulating plate 18 is laid on a floor section of the front edge flow passage 16 to narrow a cross sectional area of the flow passage. A plurality of turbulators 20 are provided on the regulating plate 18 and a ceiling section of the front edge flow passage 16 to agitate the cooling air 19.

From an outlet orifice of the front edge flow passage 16, a central flow passage 21 having a cross sectional area smaller than that of the front edge flow passage 16 is pulled out. The central flow passage 21 comes out from a rear edge 23 of the inner shroud 2 that is downstream of the flow passage of combustion gas along the welded joints 22 of the inner shrouds 2. From a position near an inlet orifice of the front edge flow passage 16 also, a side edge flow passage 24 having a cross sectional area smaller than that of the front edge flow passage 16 is pulled out. The side edge flow passage 24 comes out from the rear edge 23 along a side edge 25 of the inner shroud 2 (refer to FIG. 16 and FIG. 18). The cooling structure is provided for each pair of units constituting the segment 1, and a pair of left and right cooling structures are provided to constitute a cooling structure of the inner shroud 2.

At the time of actuation of the gas turbine, when the inner shroud 2 is to be cooled, cooling air 19 is sent to the impingement tube 14 in the stationary blade section 3 from the outer shroud 4. The cooling air 19 subjects the stationary blade section 3 to impingement cooling, a portion of the cooling air 19 flows into the open chamber 11 in the inner shroud 2 through the front edge passage 9 of the stationary blade section, and a portion of the cooling air 19 penetrates the inner shroud 2 through the stationary blade section rear edge passage 10 and is supplied to the cavity 12 (refer to FIG. 17). The cooling air 19 which has flowed into the open chamber 11 flows into the front edge flow passage 16 through the intermediate flow passage 17 to convection-cool the front edge of the inner shroud 2. A portion of the air flows into the side edge flow passage 24 from an inlet orifice of the front edge flow passage 16, convection-cools the side edge 25 of the inner shroud 2, and is discharged from the rear edge 23. Remaining cooling air 19 flows into the central flow passage 21 from the outlet orifice of the front edge flow passage 16, convection-cools welded joints 22 of the inner shrouds, and is discharged from the rear edge 23.

The regulating plate 18 is provided to prevent reduction in flow speed of the cooling air 19 which passes through the front edge flow passage 16 by narrowing the cross sectional area of the passage, and to enhance the cooling efficiency of the front edge 15. The turbulator 20 agitates the cooling air 19 in the front edge flow passage 16, and enhances cooling efficiency of the front edge 15. The central flow passage 21 and the side edge flow passage 24 have cross sectional areas smaller than those of the front edge flow passage 16. Therefore, flow speed of the cooling air 19 passing through the flow passages 21 and 24 is faster than that in the front edge flow passage 16. Thus, the structure in which the flow passage is narrowed enhances the cooling efficiency near the welded joints 22 of the inner shrouds 2 and near the side edge 25.

The cooling air 19 supplied to the cavity 12 is used as sealing air for sealing a gap (not illustrated) between the gas turbine stationary blade and a gas turbine rotor blade. A portion of the sealing air is blown out from a bottom surface section of the front edge 15, to film-cool the inner shroud 2 from the front edge 15.

According to research of the present inventors, however, there has been found a phenomenon that corner sections of the front edge 15 of the inner shroud 2 in the conventional gas turbine stationary blade are burned 26, 26 and that thermal barrier coating (TBC) which is applied to the surface is removed (refer to FIG. 15). It is conceived that this is because in the conventional technique, the flow passages 16 and 24 of the cooling air 19 are not in communication up to the corner section of the front edge 15 and that the corner section is insufficiently cooled. Further, in the conventional technique, it is conceived that since both the flow passages of the central flow passage 21 and the side edge flow passage 24 are pulled out from the edge flow passage 16, the flow speed of the cooling air 19 passing through the flow passages 21 and 24 is reduced to cause reduction of the cooling efficiency.

A method in which the regulating plate 18 and the turbulator 20 are provided to maintain the cooling efficiency like the conventional technique has a problem that the cooling efficiency of the corner section of the front edge 15 is inferior and the gas turbine structure is complicated to increase production costs. A method in which the flow rate of the cooling air 19 in the inner shroud 2 is largely increased to enhance the cooling efficiency has a problem that driving cost of the gas turbine increases. There is another method in which the cross sectional areas of the central flow passage 21 and the side edge flow passage 24 are narrowed to increase the flow speed of the cooling air 19, but if the cross sectional area of the flow passage is excessively narrowed, the range that can be cooled is also narrowed, and therefore the cooling efficiency of the corner section of the front edge 15 is further lowered.

SUMMARY OF THE INVENTION

It is an object of this invention to provide a gas turbine stationary blade for effectively cooling the inner shroud with a simple structure.

The gas turbine stationary blade according to this invention comprises a stationary blade section provided therein with a passage for cooling air, an inner shroud for supporting the stationary blade section on the side of a discharge port of the cooling air, and a plurality of segments each of which includes at least one of the stationary blades and at least one of the inner shrouds and which are coupled to one another in an annular form. At least one flow passage is pulled out from the discharge port of the cooling air of the stationary blade section, and the flow passage is introduced to a corner section on the side of a front edge of the inner shroud and is extended rearward along a side edge of the inner shroud.

Other objects and features of this invention will become apparent from the following description with reference to the accompanying drawings.

DETAILED DESCRIPTIONS

Figure 1A:
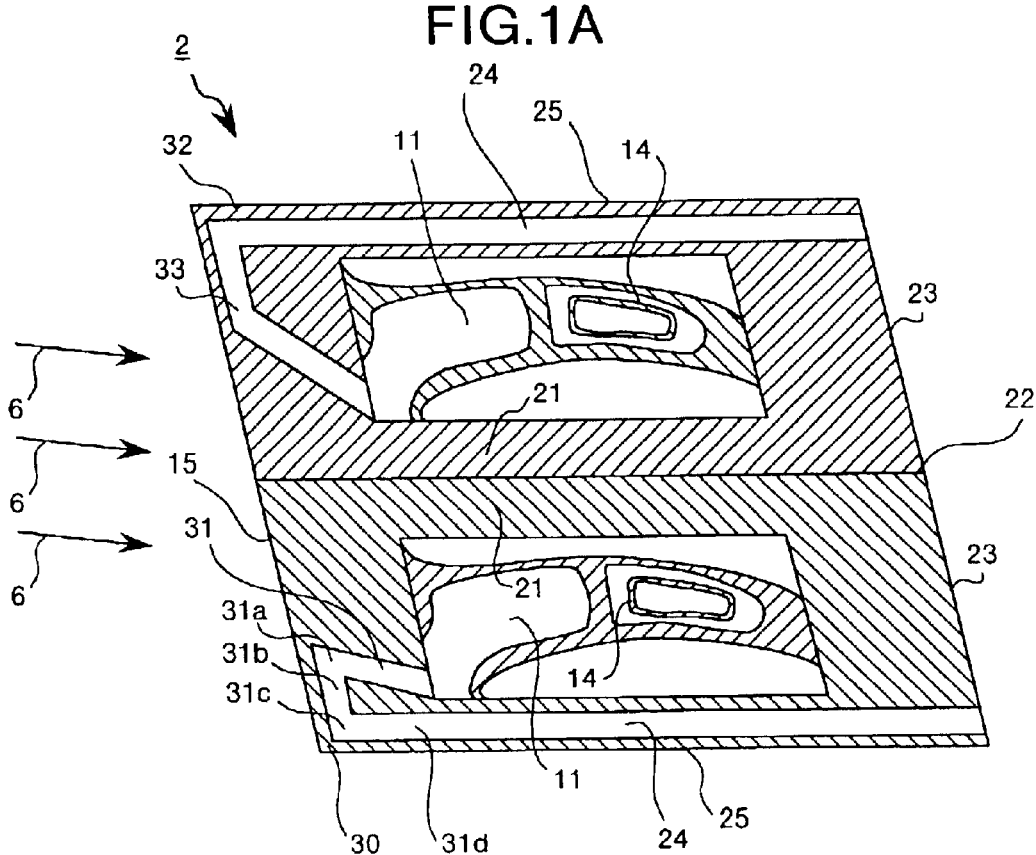
FIG. 1A and FIG. 1B show plan sectional views which show inner shroud of an embodiment of the present invention.

Embodiment of this invention will be described in detail below with reference to the drawings. However, this invention is not limited by the embodiment. Any elements that can usually be changed by a person skilled in the art are included in constituent elements described in the following embodiment.

According to the research of the present inventors, the burnout 26 occurs if the combustion gas 6 is trapped into the gap 7 of the inner shrouds 2 when the gas turbine is driven and the thermal barrier coatings of the corner sections 30 and 32 of the front edge 15 are subjected to corrosion. In this invention, in order to prevent the burnout 26, the corner section of the front edge 15 of the inner shroud 2 is provided with a cooling structure, or trapping itself of the combustion gas 6 is restrained.

Figure 1B:
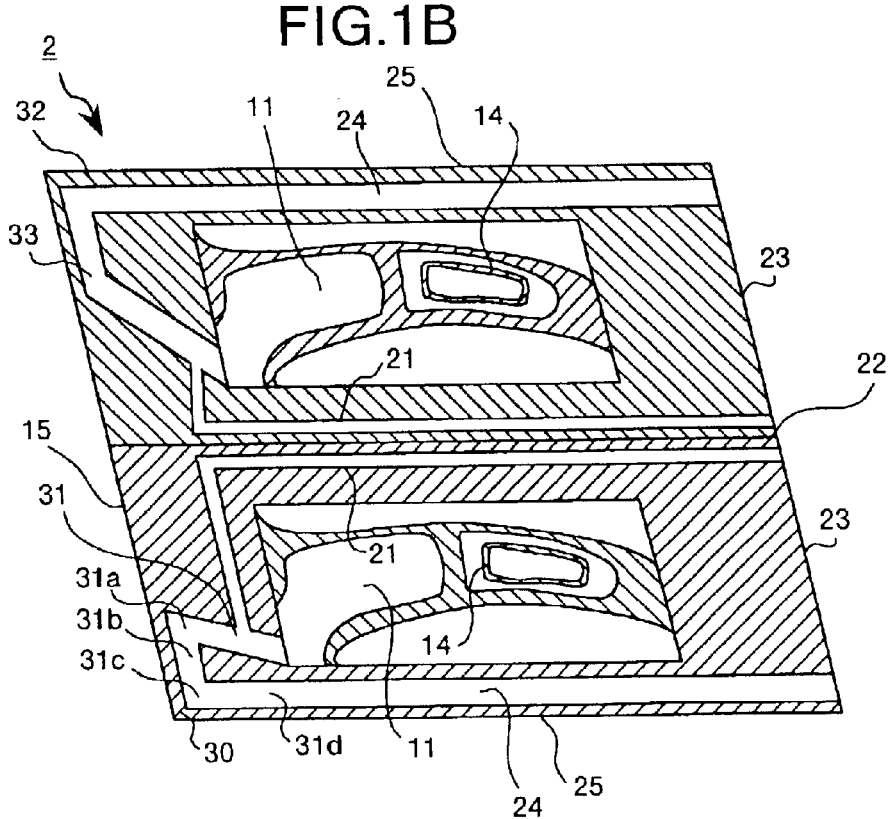

FIG. 1A and FIG. 1B show sectional plan views which show an inner shroud of a segment constituting a gas turbine stationary blade according to the embodiment of this invention, in which FIG. 1A shows one embodiment and FIG. 1B shows another embodiment. In the figures, the same constituent elements as those in the conventional gas turbine stationary blade are designated with the same numerals, and explanation thereof is omitted.

In FIG. 1A, a unit of the inner shroud 2 on the side of an obtuse angle corner section 30 (right side as viewed from a flow-in direction of the combustion gas 6) includes an open chamber 11 which is in communication with a front edge passage 9 of the stationary blade section. One flow passage 31 of cooling air 19 is pulled out in a direction of the front edge 15 of the inner shroud 2 from the open chamber 11. This flow passage 31 on the side of the obtuse angle corner section 30 ("obtuse angle corner section flow passage 31", hereinafter) has a rectangular cross-section substantially uniformly.

The obtuse angle corner section flow passage 31 is bent at two sections like a hook as shown in FIG. 1A. Its first bend 31*a* is located near a middle portion of the front edge 15. A middle straight section 31*b* of the obtuse angle corner section flow passage 31 extends along the front edge 15, and its second bend 31*c* is located in the obtuse angle corner section 30. A final straight section 31*d* of the obtuse angle corner section flow passage 31 extends rearward from the obtuse angle corner section 30 along the side edge 25, and comes out from the rear edge 23.

A unit of the inner shroud 2 on the side of an acute angle corner section 32 (left side as viewed from the flow-in direction of the combustion gas 6) comprises the open chamber 11 and one flow passage 33 of cooling air 19 like the unit on the side of the obtuse angle corner section 30. The flow passage 33 on the side of the acute angle corner section 32 ("acute angle corner section flow passage 33", hereinafter) is installed in the same manner as that of the obtuse angle corner section flow passage 31 except that the flow passage 33 is bent at two sections like a hook as shown in FIG. 1A.

Washers are provided on outsides of the inner shrouds 2 of respective units forming the welded joints 22 for the unit on the side of the obtuse angle corner section 30 and the unit on the side of the acute angle corner section 32, and these units are fastened and fixed to each other by bolts and nuts (not illustrated). A pair of unit bodies prepared in such a manner is mounted to the segment for support under pressure.

When the gas turbine is actuated, a cooling air 19 is sent from the outer shroud 4 to the open chamber 11 through the stationary blade section 3, and flows into each of the flow passages 31, 33 pulled out from the open chamber 11 in a direction of the front edge 15. The cooling air 19 convection-cools a shoulder port of the front edge 15, a corner of the front edge 15, and the side edge 25, and is discharged from the rear edge 23. FIG. 1B shows another embodiment in which cooling passages 21, 21 are provided also on the side of a bolt/nut joint face of the inner shroud 2.

Although a shape of the cross-section of the respective flow passages 31, 33 is rectangular in this embodiment, the shape is not limited to this example, and may be circular or triangular. As the cross sectional area of the respective flow passages 31, 33 is smaller, flow speed of the cooling air passing through the passage is increased, which enhances the cooling efficiency. However, if the cross sectional area of the flow passage is excessively small, a range to be cooled by the cooling air becomes narrow. Therefore, it is preferable to appropriately change the cross sectional area of the respective flow passages 31, 33 in accordance with a specification or the like of the gas turbine.

In the embodiment, although the obtuse angle corner section flow passage 31 is of the above described hook shape, the shape is not limited to this, and may be of a ticking symbol or the hook shape more widely opened at an end of the shorter passage. This is because a burnout 26 of the inner shroud 2 can be prevented only if the obtuse angle corner section flow passage 31 passes through the corner section of the front edge 15 and the side edge 25 of the inner shroud 2. The same can be also applied to the acute angle corner section flow passage 33.

Figure 2:
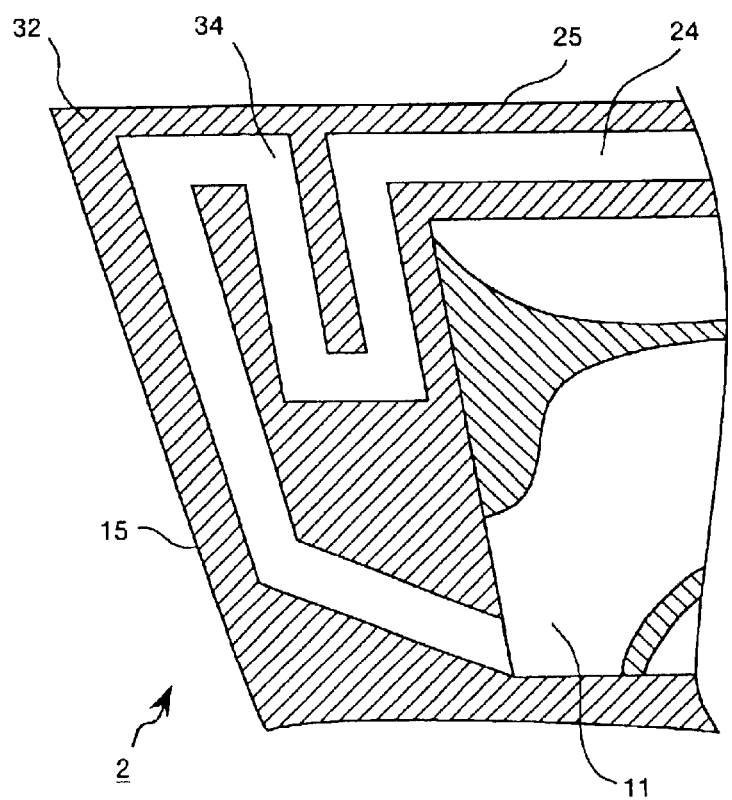
FIG. 2 is a plan sectional view which shows a meandering flow passage of cooling air.

The acute angle corner section flow passage 33 may meander at the acute angle corner section 32 where the burnout 26 is remarkable (refer to FIG. 2). In this structure, the cooling air 19 meanders in the acute angle corner section 32 of the inner shroud 2 through the flow passage 33. The cooling air 19 convection-cools the acute angle corner section 32, and passes through the side edge flow passage 24 to be discharged from the rear edge 23. According to this structure, since the number of the flow passage 33 of the cooling air 19 is one, the flow speed of the cooling air 19 is not lowered so much even if the burnout 26 includes a relatively wide range. According to this structure, the meandering flow passage 34 is possible to effectively cool the acute angle corner section 32 having remarkable burnout 26.

When the acute angle corner section flow passage 33 passes through the acute angle corner section 32, its flow passage width may be widened to substantially the same width as a range of the burnout 26 to obtain a flow passage 35, and the regulating plate 18 may be installed on its floor section. In this structure, the regulating plate 18 functions to maintain the cross sectional area of the acute angle corner section flow passage 33 to be substantially constant. Therefore, the cooling air 19 passes through the widened flow passage 35 without reducing the flow speed, and convection-cools the acute angle corner section 32. According to this structure, since the widened flow passage 35 can cool a wide range, it is possible to effectively cool the acute angle corner section 32 having remarkable burnout 26.

Figure 3:
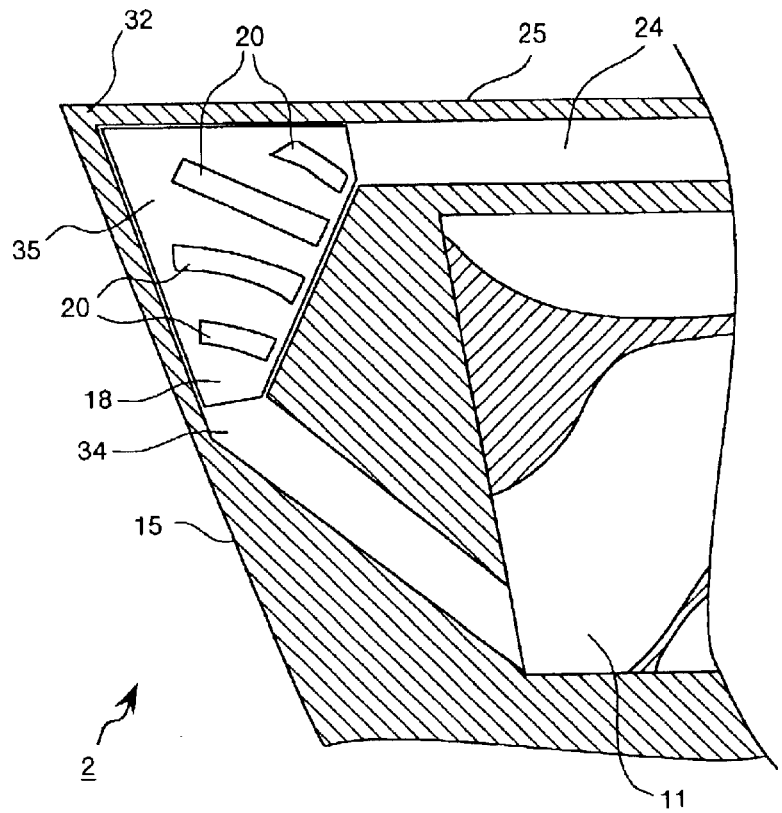
FIG. 3 is a plan sectional view which shows a widened flow passage of cooling air.

In the above structure, turbulators 20 may further be installed on the widened flow passage 35 (refer to FIG. 3). In this structure, the turbulators 20 agitate the cooling air 19 passing through the acute angle corner section flow passage 33, which enhances the cooling efficiency in its installation range. According to this structure, it is possible to further enhance the cooling efficiency of the acute angle corner section 32.

Figure 4:
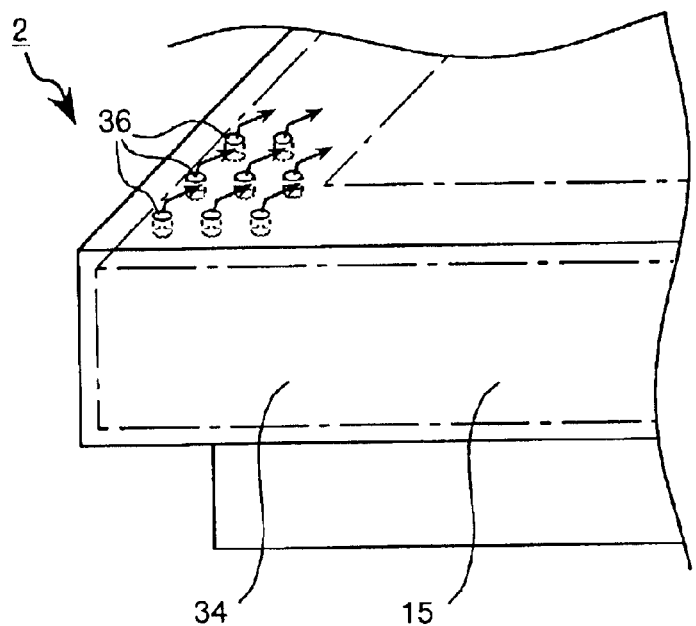
FIG. 4 is a perspective view which shows a front edge acute angle corner section provided with film cooling holes.

In this embodiment, film cooling holes 36 being pulled out from the acute angle corner section flow passage 33 and having blowoff holes (refer to FIG. 4) in the acute angle corner section 32 may be provided. In this structure, a portion of the cooling air passing through the acute angle corner section flow passage 33 is discharged from the film cooling holes to form a thin film of the cooling air 19 on the acute angle corner section 32 of the inner shroud 2. The thin film of the cooling air 19 restrains flow-in of heat of the combustion gas 6 toward the inner shroud 2. According to this structure, since the cooling air 19 cools the acute angle corner section 32 of the inner shroud 2 from both sides its inside and its surface, it is possible to cool the acute angle corner section 32 more efficiently as compared with the case where the film cooling holes 36 are not provided.

Especially in this embodiment, the acute angle corner section flow passage 33 is pulled out from the open chamber 11 by the flow passage, and is not provided with a branch. Therefore, even if some fine film cooling holes 36 are provided, the flow speed of the cooling air 19 is not lowered so much, and it is possible to sufficiently cool the side edge 25 of the inner shroud 2 located in a downstream region of the cooling holes. In recent years, it is possible to make the fine film cooling holes 36 easily at a high speed by YAG laser with low cost.

It is preferable to provide the film cooling holes at a location where the burnout 26 of the acute angle corner section 32 of the inner shroud 2 can effectively be prevented. Therefore, it is preferable that the location is appropriately changed in accordance with a range of the burnout 26 of the inner shroud 2 and characteristics of the flow passage of the combustion gas 6. For example, when the film cooling holes 36 are widely provided over the entire range where the burnout 26 occurs (refer to FIG. 4), it is possible to effectively cool the burnout portion 26 by transpiration cooling effect (spill-out cooling effect).

Figure 5:
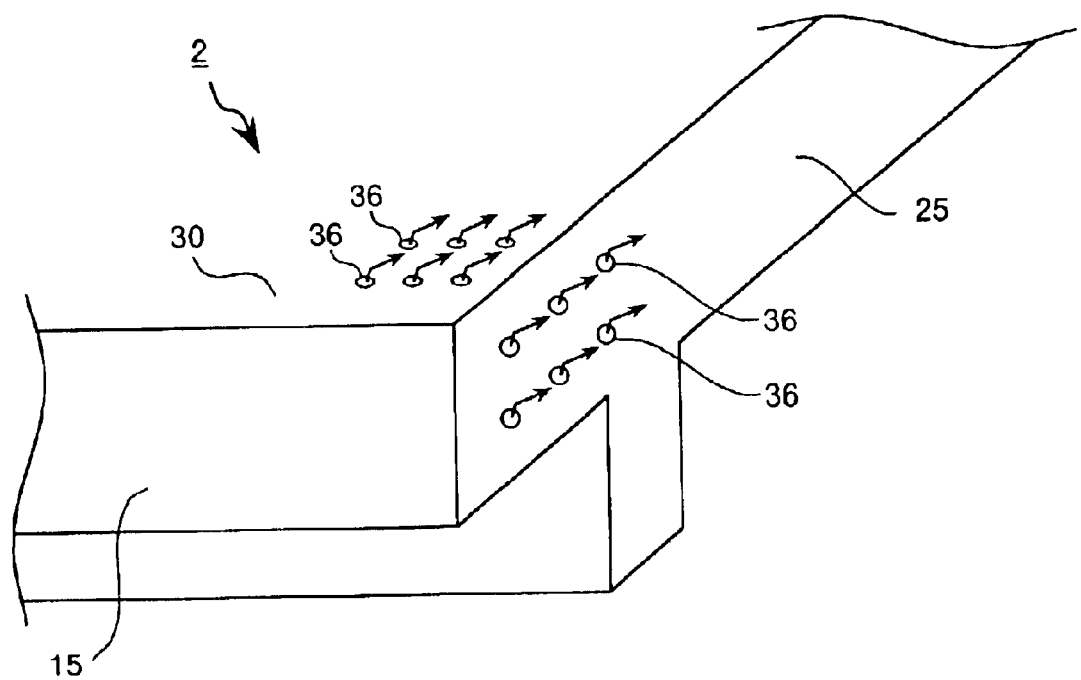
FIG. 5 is a perspective view which shows a front edge obtuse angle corner section provided with film cooling holes.

The cooling structure of the acute angle corner section 32 of the inner shroud 2 can be provided in the obtuse angle corner section 30 similarly. For example, the obtuse angle corner section 30 is provided with the film cooling holes 36 (refer to FIG. 5). Its specific structure is preferably changed appropriately within a range of knowledge of a person skilled in the art.

Figure 6:
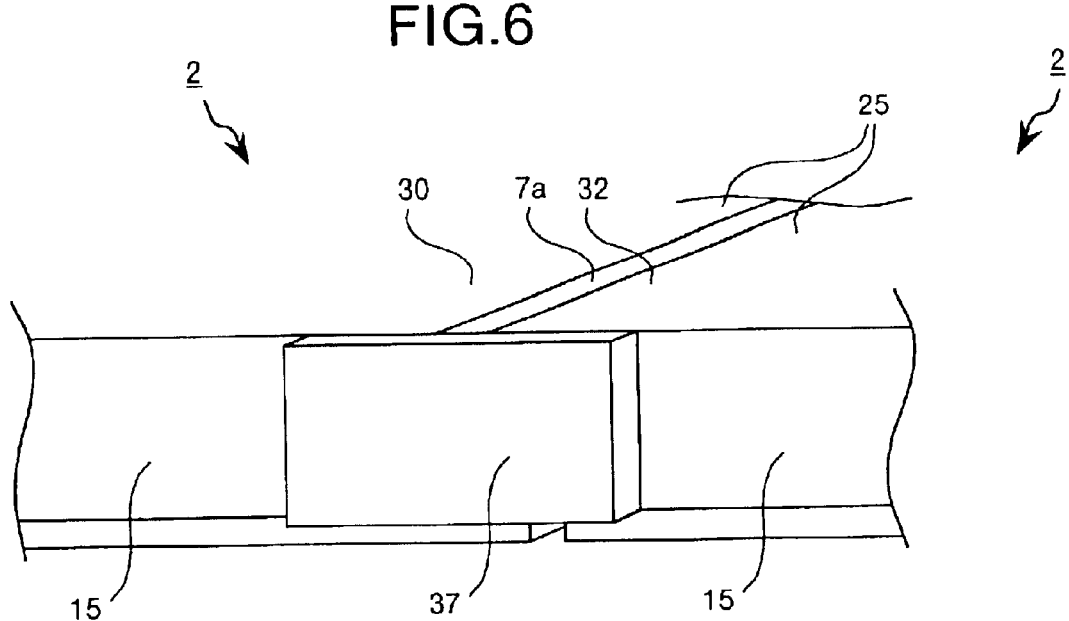
FIG. 6 is a perspective view which shows front edge corner sections provided with a covering member.

In the present embodiment, a covering member 37 may be provided between an end of the side face of the front edge 15 of the inner shroud 2 and an end of the side face of the front edge 15 of an adjacent inner shroud 2 (refer to FIG. 6). Here, the covering member 37 is a rectangular plate member 37 made of a metal material, its height is substantially the same as that of the side face of the front edge 15 of the inner shroud 2. In this structure, the covering member 37 covers a gap 7a produced between the bolt jointing faces of the inner shroud 2, which prevents the combustion gas 6 from trapping into the gap 7a. According to this structure, it is possible to prevent the corner section of the front edge 15 from being eroded by the combustion gas 6, which makes it possible to restrain the burnout 26 of the corner section of the front edge 15.

The shape of the covering member 37 is not limited to the above described rectangular, and may be a plate member having an L-shaped cross section (not illustrated). If the covering member 37 is formed into such a shape, a portion up to the gap 7a around which the burnout 26 occurs can be covered with the covering member 37, and therefore it is possible to restrain the burnout 26 more effectively. The cross section of the covering member 37 may be formed into a T-shape including a projection having substantially the same width and height as those of the gap 7a produced between the jointing faces (not illustrated). By installing the covering member 37 with the projection inserted into the gap 7a from the side face of the front edge 15 of the inner shroud 2, it is possible to fill the gap 7a with the projection up to a portion where the burnout 26 occurs.

Figure 7:
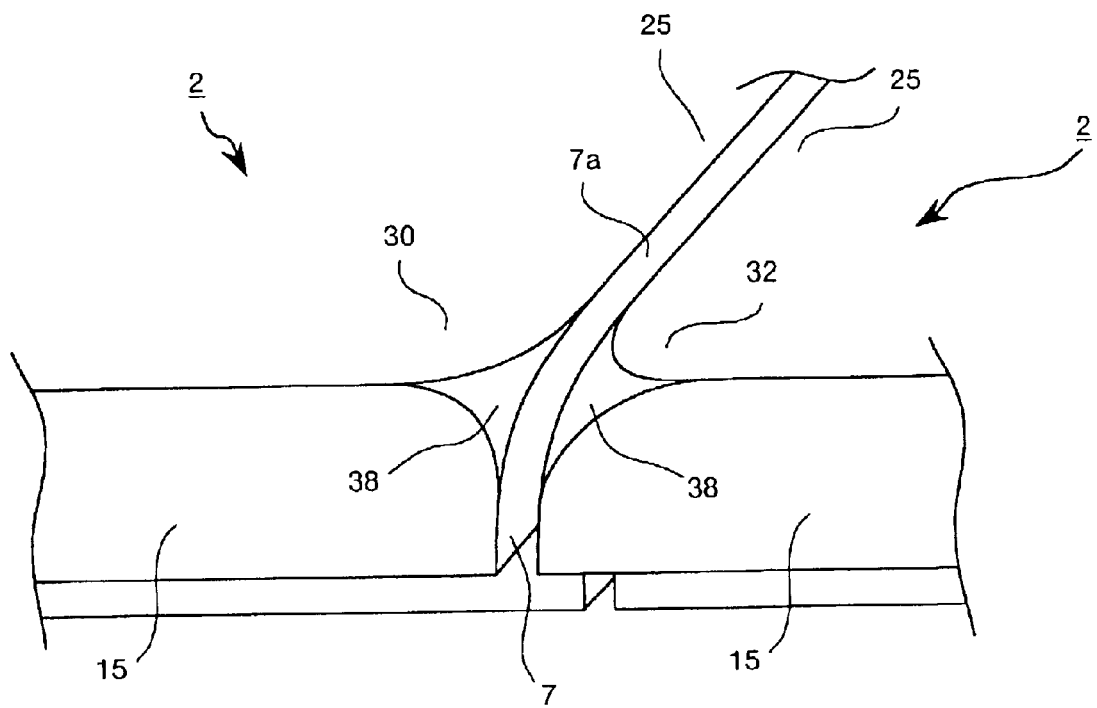
FIG. 7 is a perspective view which shows front edge corner sections each having a rounded corner section.

In this embodiment, a corner section of the front edge 15 of the inner shroud 2 may be rounded to provide a rounded form 38 thereto, and the corner section of the front edge 15 may be subjected to thermal barrier coating (refer to FIG. 7). A method of the thermal barrier coating includes known methods as follows, that is, a method of subjecting the corner section to plasma-coating with a partially stabilized Zr 203 which is a heat insulator, and a method of subjecting the corner section to thermal barrier coating with zirconia. In this structure, the corner section of the front edge 15 which is provided with the rounded form 38 and is smoothened moderates collision of the combustion gas 6 against the corner section of the front edge 15. According to this structure, it is possible to restrain the removal of the heat insulation coat on the corner section of the front edge 15 which is erosion-prone by the combustion gas 6, and therefore the burnout 26 can effectively be restrained. The rounded form 38 for the corner section of the front edge 15 may be a chamfer formed by simply cutting the corner section off (not illustrated).

Figure 8:
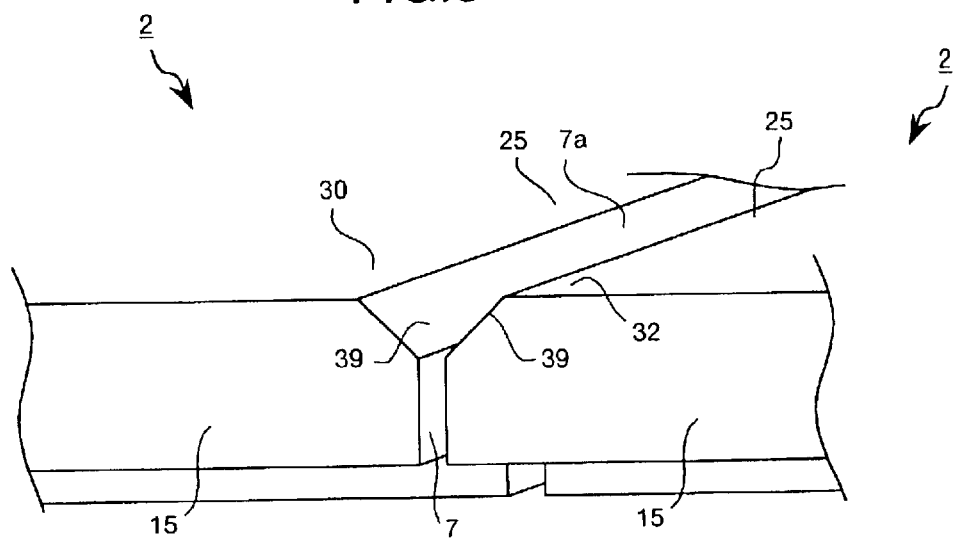
FIG. 8 is a perspective view which shows side edges each having a chamfered end.

In this embodiment, an end of the side edge 25 of the inner shroud 2 may further be formed with a chamfer 39, and the end of this side edge 25 may be subjected to the thermal barrier coating (refer to FIG. 8). In this structure, the chamfer 39 on the end of the side edge 25 restrains erosion of the end of the side edge 25 by the combustion gas 6 trapped into the gap 7a of the inner shroud 2. According to this structure, since the removal of the thermal barrier coating on the end of the side edge 25 is prevented, the burnout 26 is restrained.

Figure 9:
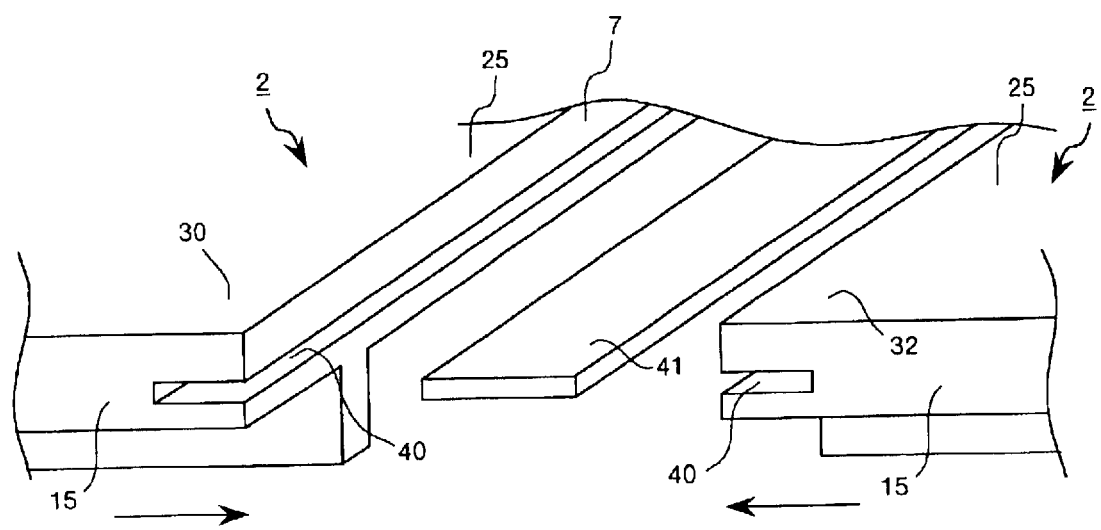
FIG. 9 is a perspective view which shows bolt jointing faces provided with a face plate to be assembled.
Figure 10:
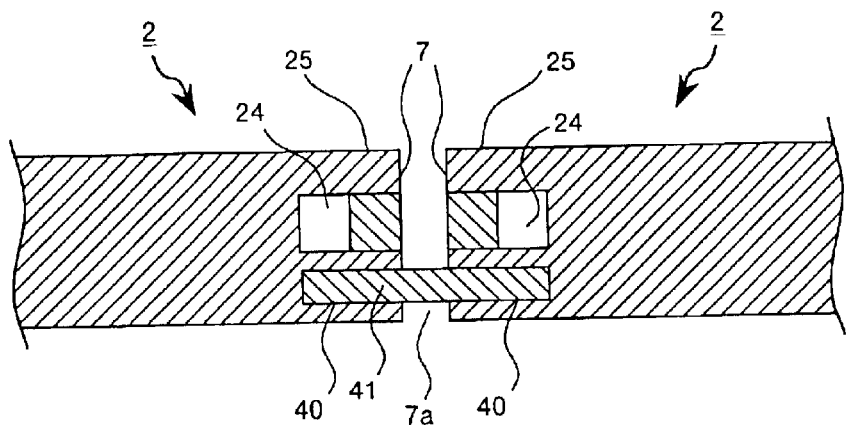
FIG. 10 is a front sectional view of FIG. 9.

In this embodiment, grooves 40 and 40 may be formed in bolt joint faces of adjacent inner shrouds 2 from the front edges 15 to the rear edges 23, and a rectangular face plate 41 may be fitted into the grooves 40 and 40 (refer to FIG. 9 and FIG. 10). In this structure, the face plate 41 seals the gap 7a between the bolt jointing faces of the inner shrouds 2, and blocks the flow passage of the combustion gas 6 passing through the gap 7a toward the back face of the inner shrouds 2. According to this structure, since the flow passage of the combustion gas 6 in the gap 7a is sealed, trapping of the combustion gas 6 to the gap 7a is restrained. Therefore, especially the burnout 26 of the side edge end section of the inner shroud 2 is restrained. This face plate 41 may not be a plate-like body and may be a columnar body (not illustrated). It is unnecessary that this face plate 41 has a length corresponding to that from the front edge 15 to the rear edge 23 of the inner shroud 2, and the length may be in such a depth that the burnout 26 can be recognized from the front edge 15.

Figure 11:
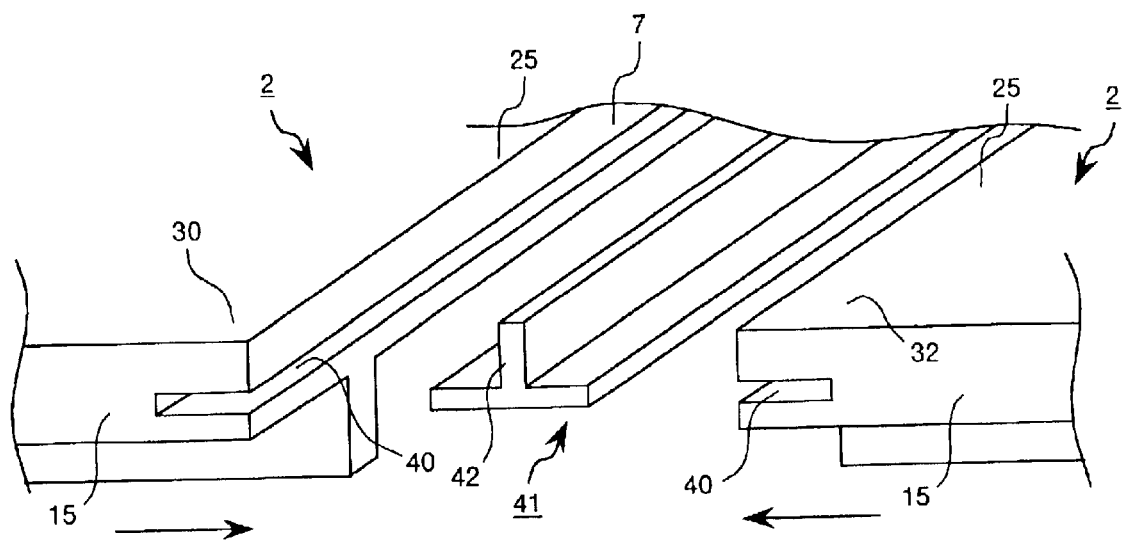
FIG. 11 is a perspective view which shows bolt jointing faces provided with a projected face plate to be assembled.
Figure 12:
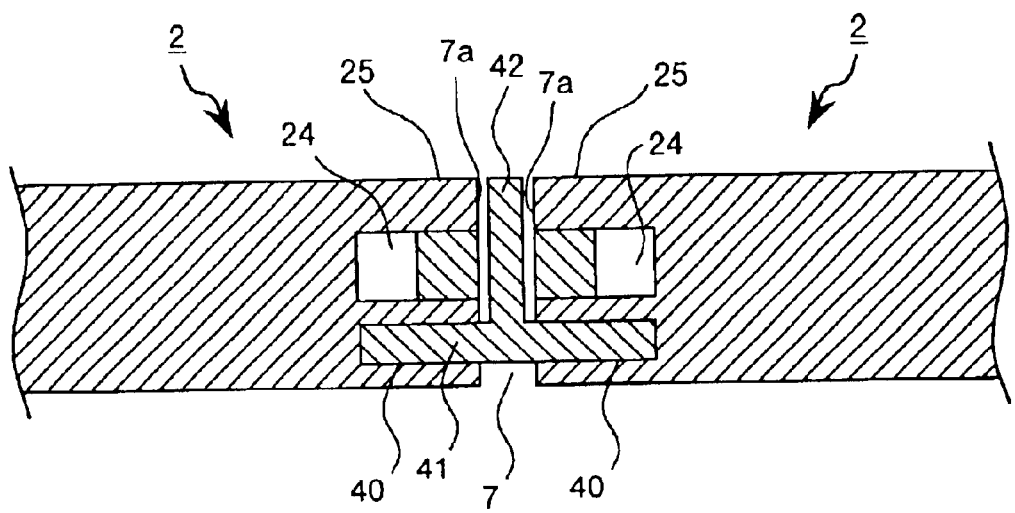
FIG. 12 is a front sectional view of FIG. 11.

A central portion of the face plate 41 may be formed with a projection 42 for filling the gap 7 of the segment 1 over its length direction, and the projection 42 may be directed to surfaces of the inner shrouds 2 (refer to FIG. 11 and FIG. 12). In this structure, the projection 42 is sandwiched between the jointing faces of the inner shrouds 2 to fill the gap 7. According to this structure, since the surfaces of the inner shrouds 2 are flattened by this projection 42, it is possible to restrain trapping of the combustion gas 6 into the gap 7 more effectively as compared with the case where the projection 42 is not provided.

Figure 13:
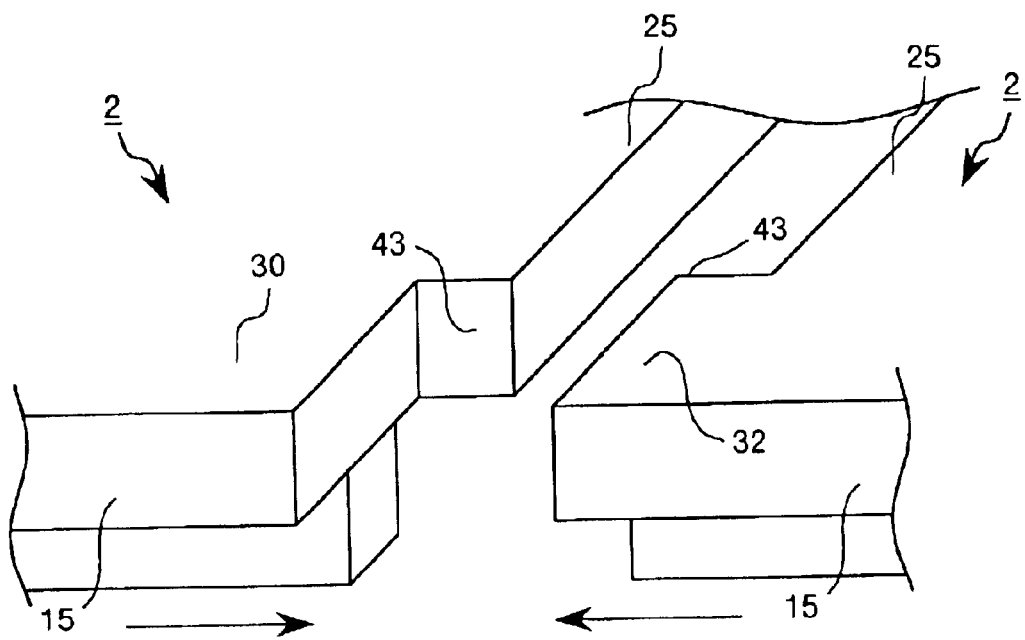
FIG. 13 is a perspective view which shows shiplap type bolt joint faces.
Figure 14:
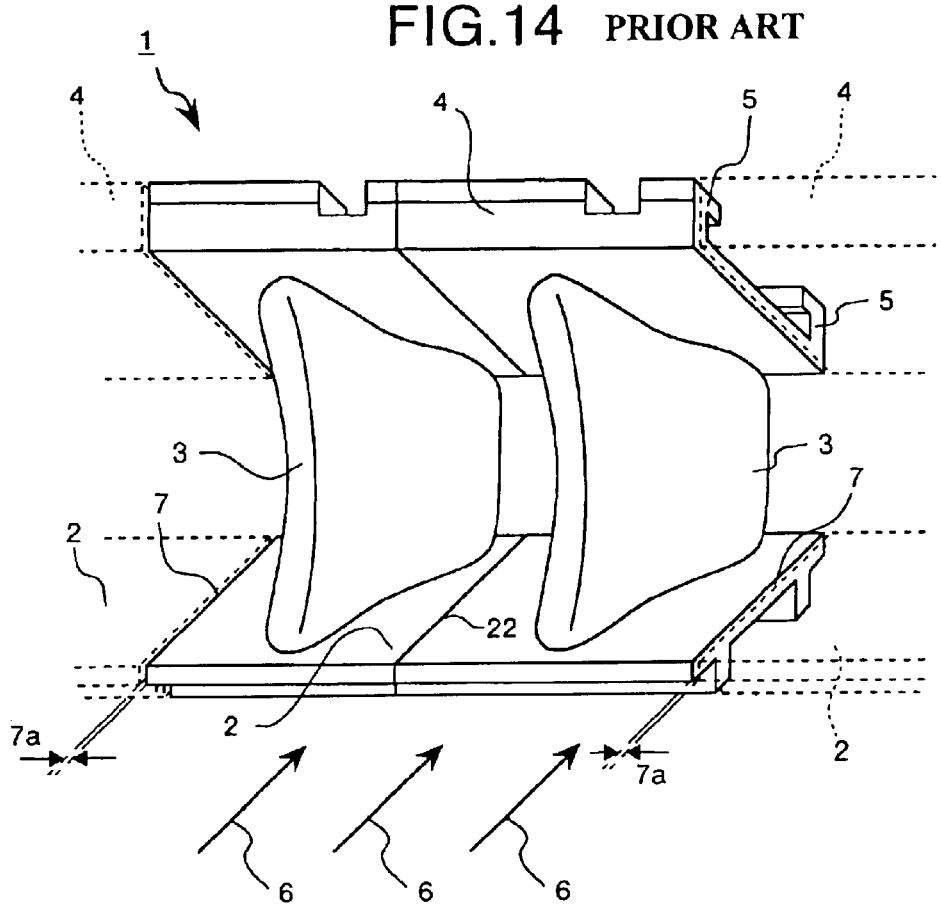
FIG. 14 is a perspective view which shows blade series of the gas turbine stationary blade.
Figure 15:
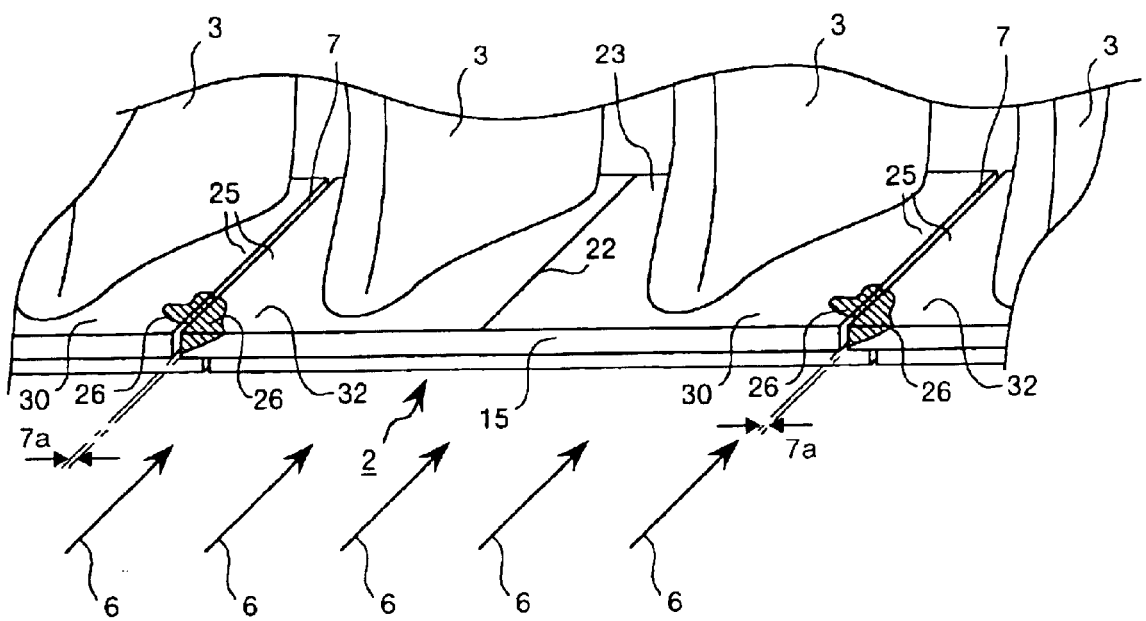
FIG. 15 is a perspective view which shows the inner shroud and its periphery of the gas turbine stationary blade.
Figure 16:
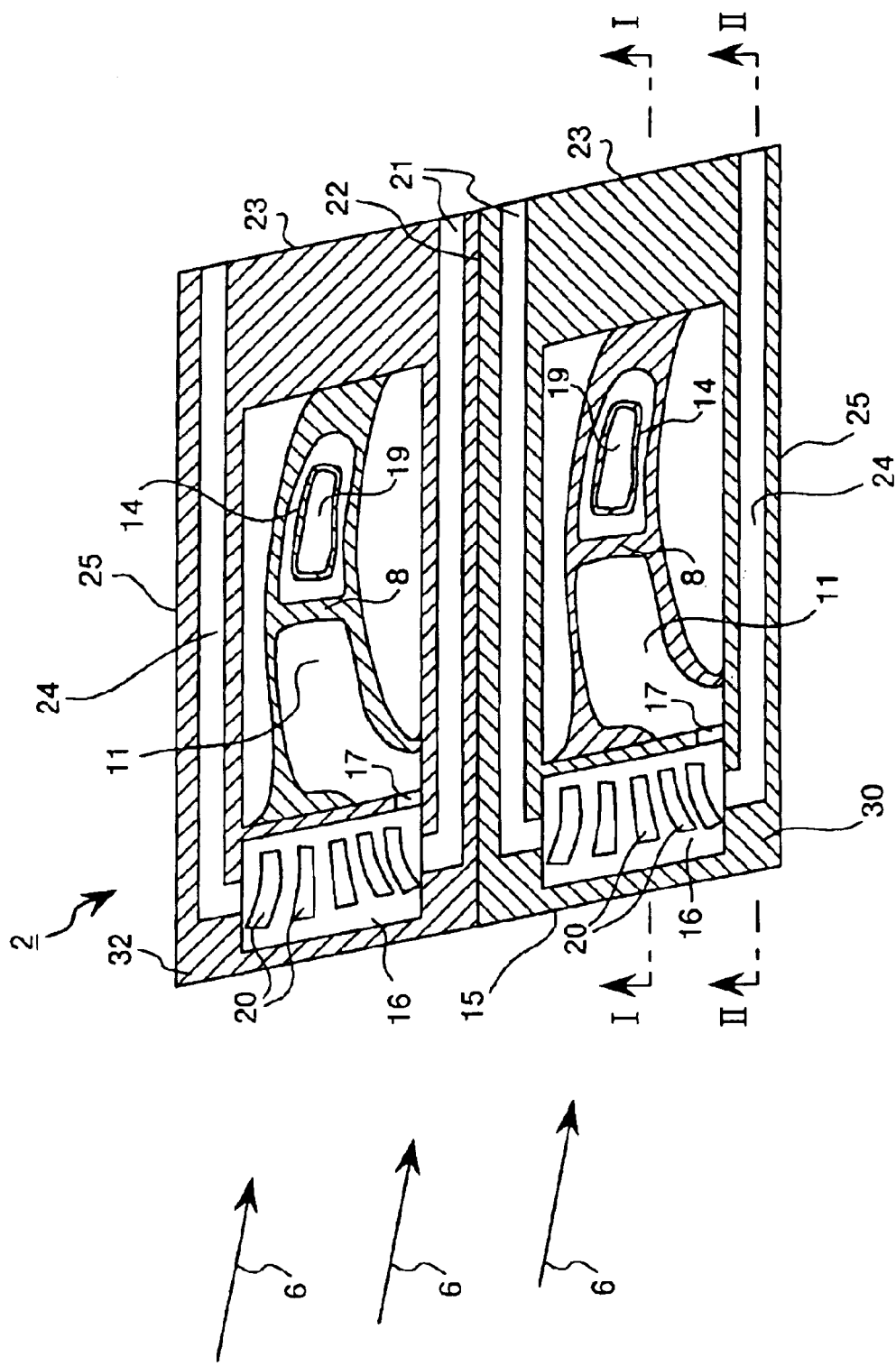
FIG. 16 is a plan sectional view of the conventional inner shroud.
Figure 17:
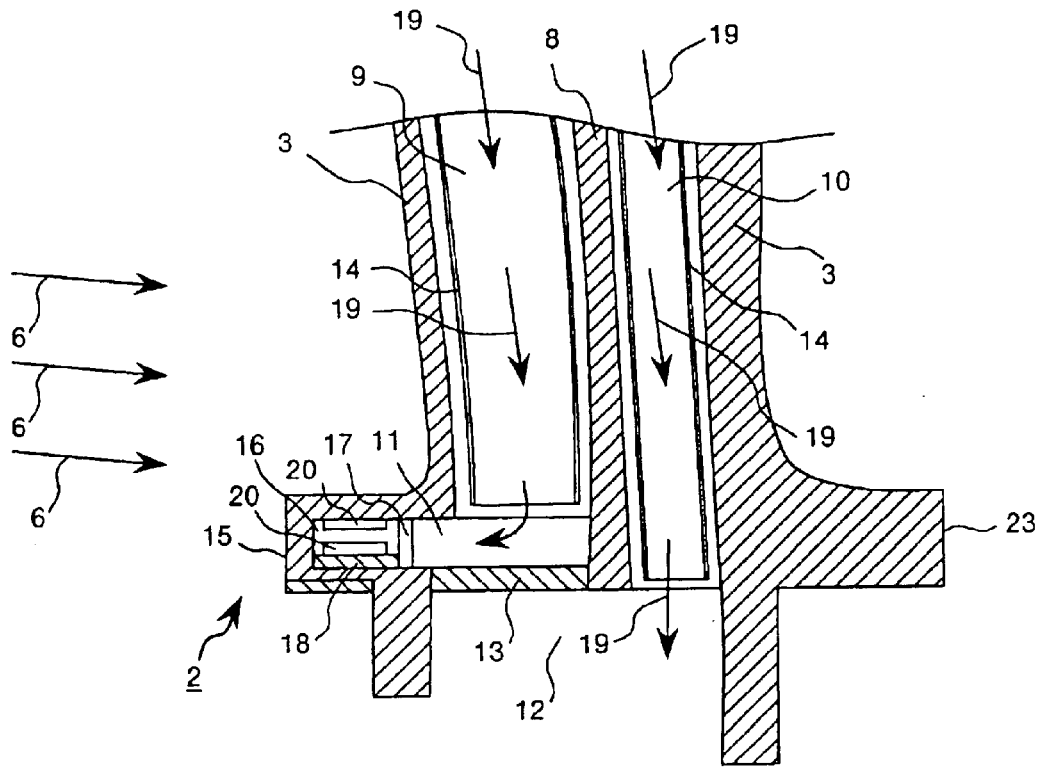
FIG. 17 is a sectional view taken along the line I—I in FIG. 16.
Figure 18:
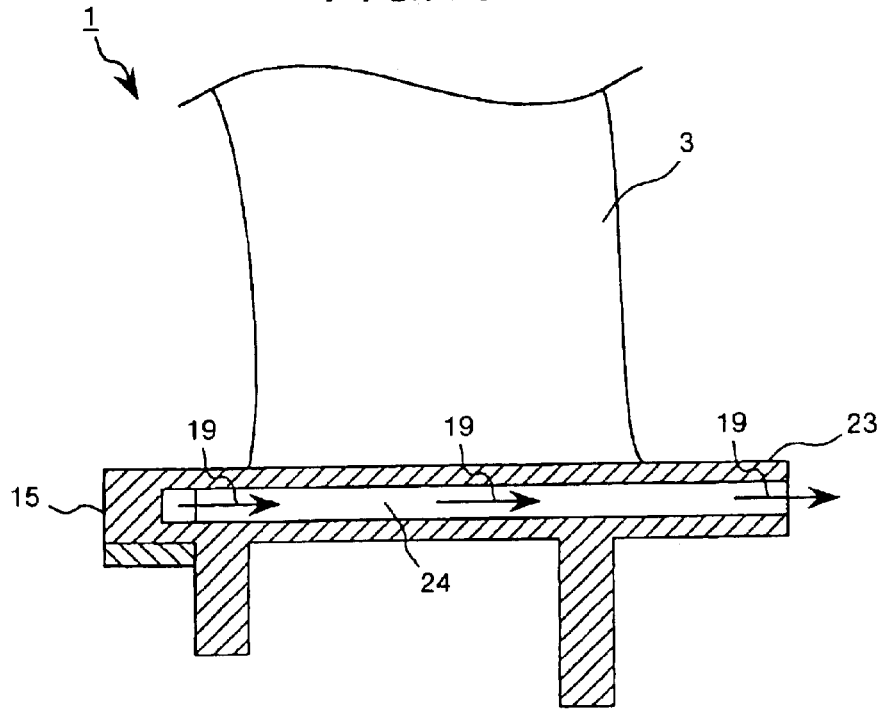
FIG. 18 is a sectional view taken along the line II—II in FIG. 16.

In this embodiment, bolt jointing faces 43 and 43 of the inner shrouds 2 may be of shiplap structure in which they are meshed with each other (refer to FIG. 13). In this structure, the stepped bolt jointing faces 43 and 43 block a flow of the combustion gas 6 flowing from the front edge 15 to the rear edge 23 through the gap 7 of the inner shrouds 2 in the step section. According to this structure, since the flow passage of the combustion gas 6 passing through the gap 7 is blocked, trapping of the combustion gas 6 to the gap 7 is restrained. Therefore, especially a burnout 26 around the corner section of the front edge 15 of the inner shroud 2 is effectively prevented. The meshed bolt jointing faces 43 and 43 may not be of step-shape. For example, the bolt jointing faces may be of serrate or corrugated form.

As described above, according to the gas turbine stationary blade of this invention, the flow passage of the cooling air passes through the corner section of the inner shroud. Thus, the cooling air cools the corner section, and restrains the burnout. One flow passage of the cooling air is provided in a range from its portion pulled out from the discharge port of the stationary blade section to its portion at least passing through the front edge corner section of the inner shroud.

Moreover, the inner shrouds of the segment are coupled to each other by a bolt, and therefore it is easy to disperse distortion caused by thermal stress as compared with the case where the inner shrouds are integrally formed by welding or the like. Therefore, a local collective stress produced particularly in an end of the stationary blade section or the inner shroud is relaxed, and occurrence of crack is restrained.

Furthermore, the flow passage meanders in the front edge corner section of the inner shroud. Therefore, even if the burnout has a quite large width, it is possible to effectively cool the flow passage.

Moreover, the flow passage is widened in the front edge corner section of the inner shroud, and therefore it is possible to cool the front edge corner section more effectively as compared with the case where the flow passage is not widened. Further, the regulating plate is installed on the floor section of the widened flow passage. Therefore, the flow speed is not significantly lowered by widening the flow passage.

Furthermore, the cooling air which is flowed into the widened flow passage is agitated by the turbulator, and therefore it is possible to efficiently cool the front edge corner section of the inner shroud.

Moreover, since the cooling air which is flowed into the widened flow passage collides against the acicular fin and is agitated, it is possible to efficiently cool the front edge corner section of the inner shroud. Further, heat exchange is carried out between the cooling air and the front edge corner section of the inner shroud through the acicular fin and thus, it is possible to cool the corner section of the inner shroud more efficiently as compared with the case in which the acicular fin is not provided.

Furthermore, the cooling air injected from the film cooling holes film-cools the corner section of the inner shroud from its surface. Therefore, it is possible to cool the corner section efficiently together with the cooling of the inner shroud from its inside. Further, since the number of flow passages for the cooling air is one, it is possible to cool the downstream side edge of the inner shroud while maintaining the relatively high flow speed even if fine film cooling holes are provided.

Moreover, since trapping of the combustion gas into the gap of the inner shrouds can be prevented, it is possible to restrain the burnout of the front edge corner section effectively.

Furthermore, since the chamfer on the front edge corner section restrains removal of the thermal barrier coating, it is possible to restrain the burnout of the front edge corner section effectively.

Moreover, since the chamfer on the side edge corner section restrains the removal of the thermal barrier coating, it is possible to restrain the burnout of the side edge end section effectively.

Furthermore, since the sealing member provided between the jointing faces of the inner shrouds seals the gap between the jointing faces, and blocks the flow passage of the combustion gas coming out from the gap, trapping of the combustion gas into the gap is restrained. Therefore, it is possible to restrain burnout of mainly the side edge end section of the inner shroud.

Moreover, since the projection of the sealing member fills the gap produced between the segments and flattens a surface of the inner shrouds, it is possible to restrain the trapping of the combustion gas into the gap more effectively as compared with the case where the projection is not provided.

Furthermore, since the jointing faces of the shiplap type formed on the inner shrouds seal the flow passage of the combustion gas passing through the gap between the inner shrouds, trapping of the combustion gas into the gap is restrained, and particularly the burnout in the front edge corner section of the inner shroud is effectively prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gas turbine stationary blade comprising:
   a stationary blade section provided therein with a passage configured to pass cooling air;
   an inner shroud configured to support the stationary blade section on a side of a discharge port of the cooling air; and
   a plurality of segments including the stationary blade portion and the inner shroud, which are coupled to one another in an annular form,
   wherein at least one flow passage extends from the discharge port of the cooling air of the stationary blade section, and the flow passage extends to a corner section on a side of a front edge of the inner shroud and extends rearward along a side edge of the inner shroud, and
   wherein the flow passage is widened in a front edge corner section of the inner shroud, and a regulating plate is disposed on a floor of the widened flow passage.

2. The gas turbine stationary blade according to claim 1, wherein the segments are assembled such that a side end face of the inner shroud is configured to be connected to an adjacent inner shroud with a bolt.

3. The gas turbine stationary blade according to claim 1, wherein the flow passage meanders in the front edge corner section of the inner shroud.

4. The gas turbine stationary blade according to claim 1, wherein a turbulator is disposed on one of the floor and a ceiling of the widened flow passage.

5. The gas turbine stationary blade according to claim 1, wherein an acicular fin extends from the floor to a ceiling section of the widened flow passage.

6. The gas turbine stationary blade according to claim 1, wherein film cooling holes extending from the flow passage are provided on a front edge corner section of the inner shroud.

7. A gas turbine stationary blade, comprising:
   a plurality of segments coupled to one another in an annular form, each of the plurality of segments comprising:
   a first inner shroud and a second inner shroud fixed to one another side by side, wherein each of the first and second inner shrouds has a first edge and a second edge, the first edge on an upstream side of the second edge with respect to a direction of gas flow, and first and second side edges, wherein the first and second inner shrouds are fixed to one another on the first side edges thereof, with the second side edges thereof outside, and wherein each of the first and second inner shrouds has a corner section defined by the first edge and the second side edge; and
   a first stationary blade section and a second stationary blade section, each of which is provided therein with a passage configured to pass cooling air and a discharge port configured to discharge the cooling air on one end, wherein the first and second stationary blade sections are supported by the first and second inner shrouds, respectively, on the end of the blade section where the discharge port is provided;
   wherein each of the first and second inner shrouds is provided therein with a flow passage communicating with the discharge port and extending in the corner section and along the second side towards the second edge; and
   wherein the flow passage is widened in the corner section of the inner shroud, and a regulating plate is disposed on a floor of the widened flow passage.

* * * * *